(12) United States Patent
Myers et al.

(10) Patent No.: US 6,466,384 B1
(45) Date of Patent: Oct. 15, 2002

(54) APPARATUS AND METHOD FOR READING MAGNETIC IMAGES WITH AN ADJUSTABLE FORCE PRESSURE PAD

(75) Inventors: Robert Andrew Myers, Cary; Jeff David Thomas, Raleigh, both of NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/477,577

(22) Filed: Jan. 4, 2000

(51) Int. Cl.[7] .......................... G11B 25/04; G11B 17/00
(52) U.S. Cl. .......................... 360/2; 360/71; 360/130.3; 360/53; 235/484; 400/73
(58) Field of Search .................. 360/2, 71, 75, 360/90, 250, 290, 130.3, 130.31, 53; 400/73, 74; 235/483, 484, 486, 493

(56) References Cited

U.S. PATENT DOCUMENTS

| | | | |
|---|---|---|---|
| 3,157,868 A | 11/1964 | Buslik | 340/174.1 |
| 4,320,429 A | 3/1982 | Knerich et al. | 360/130.34 |
| 4,476,507 A * | 10/1984 | Koike et al. | 360/2 X |
| 4,638,392 A | 1/1987 | Akutsu | 360/130.32 |
| 5,602,688 A | 2/1997 | Yokoyama et al. | 360/69 |
| 5,634,729 A | 6/1997 | Kinney et al. | 400/73 |
| 5,865,547 A | 2/1999 | Harris et al. | 400/578 |
| 6,115,218 A * | 9/2000 | Milo et al. | 360/130.22 |

FOREIGN PATENT DOCUMENTS

GB 826010 12/1969

* cited by examiner

Primary Examiner—Andrew L. Sniezek
(74) Attorney, Agent, or Firm—J. Bruce Schelkopf; Ronald V. Davidge, Inc.

(57) ABSTRACT

A device for reading magnetically encoded data on a document, such as a strip of characters printed in magnetic ink along the lower edge of a check, executes a subroutine to determine whether each character, as it is read, is legitimate. This error detection may be done by comparing recognized code patterns with legitimate code patterns, or by comparing a signal representing the strength of the signal derived from the output of the magnetic read head reading the data with a predetermined level. If an error is detected, the magnetically encoded data is read and checked again, as often as need up to a predetermined number of attempts to read the data.

20 Claims, 3 Drawing Sheets

APPARATUS AND METHOD FOR READING MAGNETIC IMAGES WITH AN ADJUSTABLE FORCE PRESSURE PAD

BACKGROUND OF THE INVENTION

1. Field of the Invention

This invention relates to reading magnetic images with the application of a variable mechanical pressure between the media being read and the read head, and, more particularly to using such variable pressure for reading bank information recorded on a check using magnetically readable ink.

2. Description of the Related Art

The capability for reading the account information printed on checks by means of magnetic inks is increasingly being provided in point-of-sale terminals. This information typically describes the bank to which the check is to be directed and the particular account number and check number of the check. This information is read with a magnetic read head to drive an electronic character recognition using a method generally called MICR (Magnetic Ink Character Recognition), with the recognized codes being transmitted for comparison within a data bank to determine if the check presented at a point of sale, and then inserted within the terminal, is from a supply of checks upon which one or more bad checks has been written or if the check is from a supply of checks which has been reported as stolen.

The capability for reading magnetic ink characters on a check is often included within a point-of-sale printing terminal for printing franking information on the check, and/or for printing customer receipts and journal information. The franking information endorses the check so that it is ready for deposit into an account of the retailer. For example, U.S. Pat. Nos. 5,634,729 and 5,865,547 describe printers having this capability, each of which also includes magnetic read head for reading the magnetically encoded printed characters on a check. When franking information is printed on the check, both printing and character recognition occur as a check is passed once through the terminal.

A problem with this type of operation arises from the frequency of times when magnetic ink characters are misread, particularly because printed check forms become wrinkled, worn, or otherwise damaged during handling. When this problem occurs, the character recognition program provides an indication that a legitimate character has not been read, so that the cashier can visually read the account information, which is supplied to the system by means of a 10-key keypad forming a part of a cash register system or another device associated with the terminal. Since this problem often occurs when a line of people are waiting for the cashier, the time required for keying the data is a potential inconvenience. While U.S. Pat. No. 5,634,729 describes performing repeated attempts to read the information, until it has been correctly read, the conditions under which the additional attempts are made are the same as the conditions of the original attempt. Thus, these additional attempts often produce the same result, without correcting the information. What is needed is a mechanism for improving the accuracy of character recognition by changing the conditions under which repeated attempts are made to read the information.

Magnetically encoded information, whether in the form of magnetic structures recorded within a magnetic medium, such as a magnetic tape, or in the form of characters printed on a nonmagnetic medium using magnetic ink, is typically read using a magnetic read head on a front side of the medium and a back-up plate on the rear side of the medium to hold the medium against the magnetic head.

A number of examples from the patent literature describe apparatus for adjusting and maintaining a predetermined level of force through the medium to a magnetic read head. For example, U.S. Pat. No. 3,157,868 describes a pressure pad for use with a magnetic head, past which a number of spaced, noncontinuous documents having magnetically encoded information are passed. The pressure pad is formed by the peripheral surface of a roller in a "V"-shaped groove in a block which is spring biased toward the read head. When the medium is first moved between the roller and the read head, an impact loading associated with the passage of the leading edge of the medium causes the roller to turn through a small distance; then friction between the "V"-shaped groove and the roller overcomes friction between the roller and the medium, so that the roller is held stationary. In this way, a new surface of the roller is presented to contact the medium, minimizing wear of the roller. Also, U.S. Pat. No. 4,638,392 describes the adjustment of a magnetic head to a spring-biased mounting plate by means of three or four screws extending around the magnetic head.

U.S. Pat. No. 5,602,688 describes a method and apparatus for controlling surface pressure exerted on a movable magnetic head, such as the rotating magnetic head of a video recorder, by a recording medium, such as a videotape, to provide optimum contact between the movable magnetic head and the recording medium with high precision in a wide frequency range. The estimated surface pressure exerted is compared to a reference surface pressure in order to develop a surface pressure control signal. The surface pressure tension of the magnetic recording medium and the position of the movable magnetic head may be controlled in accordance with the surface pressure control signal. While this method provides for maintaining the surface pressure exerted on the magnetic head at a predetermined level both in a normal and fast forward mode of playback or recording, there is no means for compensating for a poorly-recorded or damaged tape by varying the surface pressure. Still, what is needed is a method to make such compensation, together with a method for making repeated attempts at reading data at such a compensation method is applied.

The patent literature also describes the movement of backup rollers to select among a number of magnetic heads which are available for use. For example, British Patent 926,010 describes a head assembly in which a number of cams is used to move a similar number of spring biased backup rollers into and out of contact with a film medium adjacent a similar number of magnetic heads for reading and/or recording of data. This head assembly is used, for example, with both 35-mm and 70-mm film having magnetic tracks for information recording. The spring rollers are brought into contact only at those head positions which are compatible with the particular type of film being used. The cams are mounted on a shaft which is manually turned with a knob.

SUMMARY OF THE INVENTION

It is therefore an objective of the present invention to improve the accuracy of reading magnetically encoded information on a document by causing the information to be read up to a predetermined maximum number of times, with the pressure established between the document and a magnetic read head being increased between each reading of the information.

It is another objective of the present invention to provide a process in which repeated readings of information are stopped when it is determined that errors are not present within the information as read.

According to a first aspect of the present invention, apparatus is provided for reading magnetically encoded information on a document, with the apparatus including a document path along which the document is moved, a magnetic read head adjacent to a first side of the document path, a pressure plate adjacent a second side of the document path, opposite the first side, a pressure application mechanism, and a controller. The magnetic read head is aligned with the document path so that the magnetically encoded information moves adjacent to the magnetic read head as the document is moved along the document path with the magnetic information adjacent to the first side of the document path. The pressure plate is aligned with the magnetic read head so that the document moves along the document path between the pressure plate and the magnetic read head. The pressure application mechanism applies a level of pressure through the document between the pressure plate and the magnetic read head, with this level of pressure being varied in increments. The controller includes an error detection circuit or subroutine for determining when all codes within the magnetically encoded information have been correctly read. The controller also includes pressure control circuits for operating the pressure application means in response to the error detection circuits to increase the level of pressure following a failure to read all the codes correctly and before an additional attempt is made to read all of the codes correctly.

DETAILED DESCRIPTION OF THE INVENTION

Figure 1:
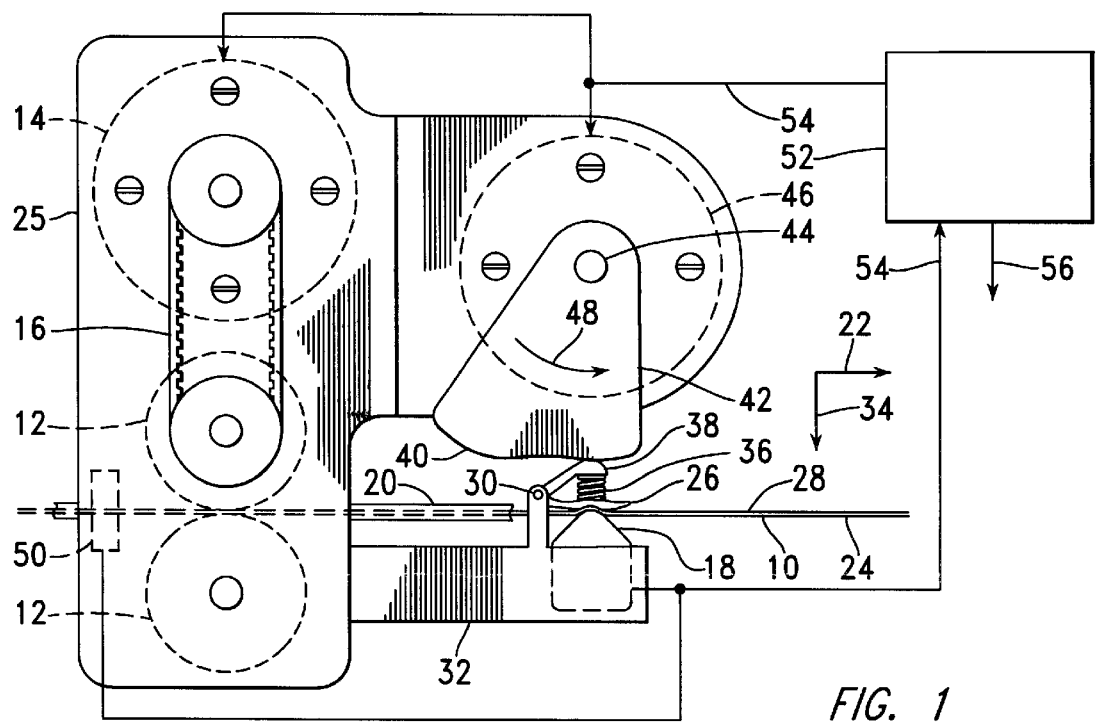
FIG. 1 is a front elevation of apparatus for reading magnetically encoded information on a document, built in accordance with a first embodiment of the present invention.

FIG. 1 is a front elevation of apparatus 8 built according a first embodiment of the present invention for reading magnetically recorded information extending along a strip on a document 10. Such information is, for example, the bank account identifying information printed along a line near the lower edge of a conventional check using a magnetically readable ink. This apparatus includes a pair of document drive rolls 12, driven by a document drive stepper motor 14 through a toothed belt 16, and a magnetic read head 18. The document 10 is fed by these drive rolls 12, along a document path defined by a document guide structure 20, in the advancing direction indicated by arrow 22 and opposite this advancing direction, with the line in which magnetic information has been printed or recorded on the lower surface 24 of the document 10 being moved adjacent to the magnetic read head 18. Various elements of this apparatus 8 are connected to one another by means of a frame bracket 25.

The magnetic read head 18 operates with a pressure plate 26 applying pressure to the upper surface 28 of the document 10, so that the lower surface 24 of this document is in intimate contact with the magnetic head 18 as the document 10 is moved between the pressure plate 26 and the magnetic head 18 for reading magnetically encoded information. The pressure plate 24 is pivotally mounted on a pin 30 extending from a housing 32, in which the magnetic read head 18 is also mounted. The pressure plate 26 is urged downward, in the direction of arrow 34, by means of a compression spring 36 extending between the pressure plate 26 and an input arm 38, which is also pivotally mounted on the pin 30. In turn, the input arm 38 is held downward by contact with a peripheral surface 40 of a cam plate 42 attached to an output shaft 44 of a force controlling stepper motor 46. The peripheral surface 40 is sloped in a direction radial to the output shaft 44 so that rotational movement of the cam plate 42 in the direction of arrow 48 causes a downward pivoting movement of the input arm 38. This downward pivoting movement of the input arm 38 in turn causes an increase in the compression of spring 36, so that additional pressure is exerted on the document 28 by means of the pressure plate 26. Similarly, as the cam plate 42 is rotated opposite the direction of arrow 48 by means of the stepper motor 46, the pressure exerted on the document 28 by means of the pressure plate 26 is decreased.

The apparatus 8 of FIG. 1 additionally includes a sensor 50 for detecting when the document 10 has been inserted into the apparatus and control electronics 52. The sensor 50 may be of a type well known to those skilled in the art, including a light source directed across the path of the document toward a photodetector, so that the illumination is seen by the photodetector. The control electronics 52 provides output signals driving the document drive stepper motor 14 for feeding the document 10 and the pressure regulating stepper motor 46 for varying the force exerted by the pressure pad 26. The control electronics 52 operates in response to inputs from the sensor 50, indicating the presence of the document 10, and from the magnetic read head 18, indicating magnetically encoded information detected in the strip extending along the lower surface 24 of document 10. The control electronics 52 further provides signals as required to drive the magnetic read head 18. Electrical connections between the control electronics 52 and various devices within the apparatus 8 are schematically indicated by arrows 54. The control electronics 52 also provides an output signal along a line 56, transmitting data read using the magnetic read head 18 to one or more additional devices (not shown).

While the first embodiment 8 of the present invention has been described as using a cam plate 42 turned through an overall angle forming a portion of a circle in the direction of arrow 48 to increase the level of pressure, and thereafter opposite the direction of arrow 48 to return the level of pressure to an initial level, it is understood that equivalent operation can be obtained by turning a multi-lobed cam incrementally in a single direction, and that such a multi-lobed cam may readily be driven by using a magnet and pawl to drive a ratchet.

Figure 2:
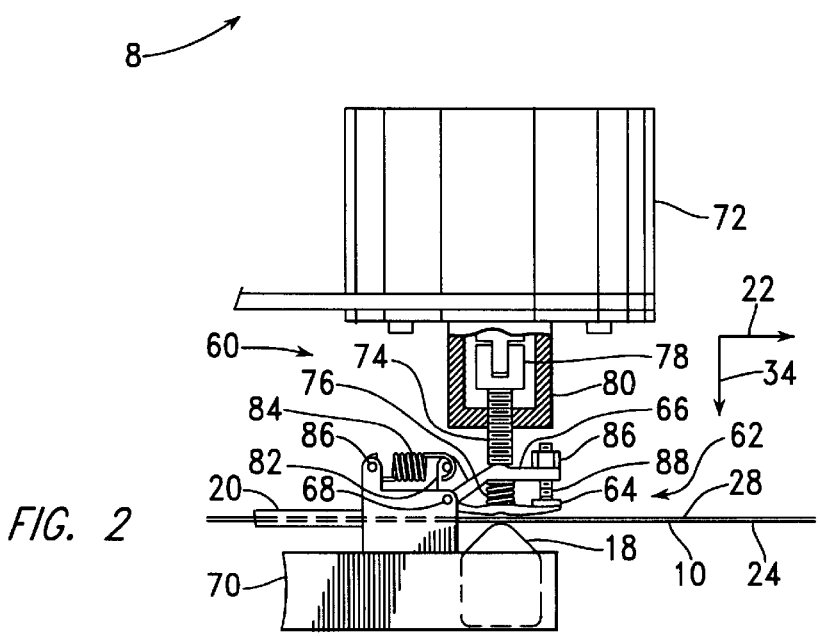
FIG. 2 is a fragmentary front elevation of apparatus for reading magnetically encoded information on a document, built in accordance with a second embodiment of the present invention.

FIG. 2 is a fragmentary front elevation of alternative apparatus 60 built in accordance with a second embodiment of the present invention for reading magnetically recorded information extending along a strip on the lower surface 24 of the document 10. In this apparatus 60, the presence of the document is sensed, the document is driven in and opposite the direction of arrow 22, and control electronics are applied in the manner described above in reference to FIG. 1, so the elements described above in reference to these functions are not shown. In this alternative apparatus 60, mechanical pressure is applied to the upper surface 28 of the document 10 by means of a load cell 62 including a pressure plate 64 and an input arm 66, each of which is pivoted on a pin 68 extending from a housing 70, which also holds the magnetic read head 18. To increase the pressure applied to the document 10 by the pressure plate 64, a stepper motor 72 is driven so that a leadscrew 74 is driven downward, in the direction of arrow 34, pivoting the input arm 66 downward so that the force provided by a compression spring 76 on the pressure plate 64 is increased. The stepper motor 72 drives the leadscrew 74 in rotation through a coupling 78, which transmits rotary motion while allowing upward and downward movement of the leadscrew 74, with such upward and downward movement occurring through the engagement of the leadscrew 74 with an internally threaded surface of a cap 80.

Within the load cell 62, means are provided for allowing the pressure plate 64 to be removed entirely from the document 10, leaving a space through which the document 10 is freely slid. To this end, the input arm 66 is provided with an upward-extending tab 82 from which an extension spring 84 extends to a pin 86 extending from the housing 70. This extension spring 84 provides a torque lifting the pressure plate 64 off the upper surface 28 with upward movement of the leadscrew 74. An adjustable stop nut 86, engaging a threaded stud 88, which extends upward as part of the pressure plate 64, limits the distance through which the pressure plate 64 can pivot downward from the input arm 66, causing the pressure plate 64 to pivot upward with upward movement of the leadscrew 76.

While the invention has been described in terms of a first embodiment 8 in which a cam plate 42 is driven by means of a stepper motor 46 and a second embodiment 60 in which a load cell 62 is configured to allow the initial formation of a gap between the pressure plate 54 and the document 10, with the load cell 62 being operated by means of a leadscrew 74, it is understood that the load cell 62 can readily be operated by means of a cam plate, and that a leadscrew can be used within apparatus as otherwise as described in reference to FIG. 1.

Figure 3:
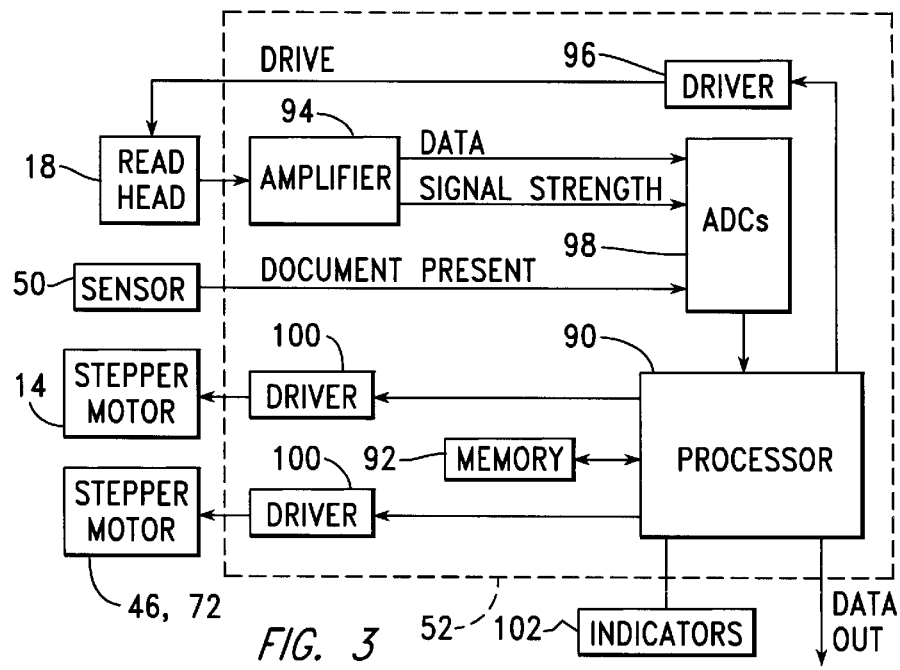
FIG. 3 is a block diagram of an electronic controller within the apparatus of FIG. 1.

While the invention has been described in terms of a mechanism changing the pressure through the document 12 between the pressure plate 26, 64 and the magnetic read head 18 by changing the force provided by a spring acting on the pressure plate 26, 64, it is apparent that equivalent results can be obtained by holding the pressure plate stationary while a variable spring force is applied to the magnetic read head FIG. 3 is a block diagram of an exemplary version of the control electronics 52 of FIG. 1. This control electronics 52 is used both with the first embodiment of the present invention, described above in reference to FIG. 1, and with the second embodiment of the invention, described above in reference to FIG. 2. In this exemplary version of the control electronics 52, operations take place under the control of a routine executing within a processor 90. Memory 92, associated with the processor 90, is used to store various instructions of this routine, and to store intermediate results of calculations, etc. Memory 92 may include both volatile and nonvolatile random access memory.

The magnetic read head 18 provides signals driving an amplifier 94, which in turn generates DATA signals representing the codes being read and an analog SIGNAL STRENGTH signal, which indicates the strength of the magnetic signal read by the read head 18. To read the data provided by characters printed in magnetic ink, it is necessary to first magnetize the ink patterns. In a preferred version of the present invention, this is done by driving the document past the read head 18 in a first pass, with the DRIVE signal being applied to the read head 18 so that a magnetic field is generated. This DRIVE signal is generated by a magnet driver 96 in response to an output of the processor 90.

The sensor 50 provides a DOCUMENT PRESENT signal whenever a document is present at the entrance to the drive rolls 12 (as shown in FIG. 1). This signal, together with the output signals from the amplifier 94 are provided as inputs to analog-to-digital converters 98, with the digital outputs of these converters 98 being provided as inputs to the processor 90.

The stepper motor 14, used to provide the document driving function, and the stepper motor 46 or 72, used to provide of function of varying the mechanical pressure used in reading magnetic characters, are each driven by a driver circuit 100, under control of the processor 90. The angular position of each stepper motor rotor may be derived from the signal applied to the stepper motor, with additional location data being generated through the use of additional position sensors (not shown). For example, the location of the document may be monitored using one or more additional sensors.

The processor 90 also drives a number of indicators 102, which may include, for example, a green LED indicating that a magnetic code has been correctly read and a red LED indicating that a magnetic code has been read without generating the required legitimate characters. The processor 90 also provides a DATA OUT signal reporting the results of successfully reading magnetically encoded data.

Figure 4:
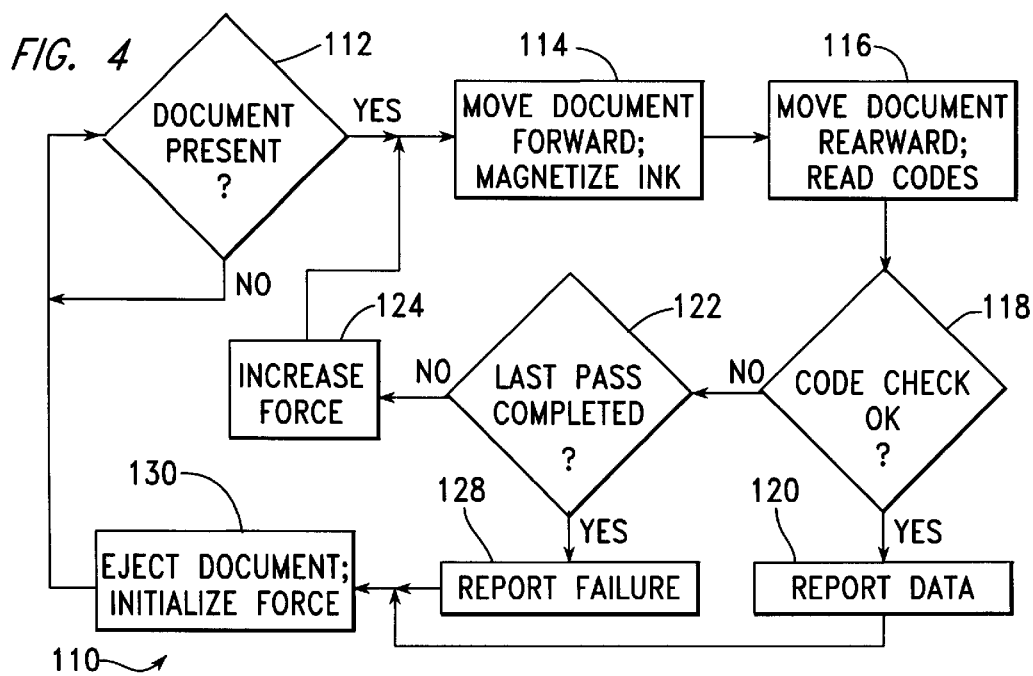
FIG. 4 is a flow chart of a first version of a process occurring within the embodiment of FIG. 1 or of FIG. 2.

FIG. 4 is a flow chart of a process 110 occurring within the first embodiment 8 of the present invention, described above in reference to FIG. 1, or, alternately, within the second embodiment 60 of the present invention, described above in reference to FIG. 2, during the reading of magnetic ink characters on a document, such as a check. This process is preferably carried on under control of the processor 90, described above in reference to FIG. 3.

Referring thus to FIGS. 1, 3, and 4, the process 110 begins with a step 112, in which the DOCUMENT PRESENT signal from the sensor 50 is periodically checked to determine if a document 10 has been inserted into the apparatus 8. If such a document has been inserted, document drive stepper motor 14 is turned on in step 114 to drive the document 10 in the forward direction of arrow 22. During this movement, the DRIVE signal to the magnetic read head 18 is turned on so that the magnetic ink is magnetized. The distance through which the document 10 is moved is determined either in accordance with a predetermined distance by turning the rollers 12 through a predetermined number of revolutions or by driving the document to a point at which a sensor provides a signal indicating the position of a document edge. The sensor 50 may be used in this way, with the document 10 being driven in the direction of arrow 22 until its trailing edge clears the sensor 50, and with the document 10 being stopped before its trailing edge reaches the rollers 12. Next, in step 116, the document drive stepper motor 14 is turned on to drive the document 10 in the rearward direction, opposite the direction of arrow 22.

During the movement of the document 12 in step 116, magnetically encoded information is read using the read head 18. This information is preferably processed through a subroutine, executing within the processor 90, for the recognition of characters printed in a standard MICR (Magnetic Ink Character Recognition) format, and for the detection of errors occurring in the process of character reading. Since, in accordance with such a format, only a subset of all possible ink patterns represent legitimate recognized characters, the recognition of a pattern not within this subset is understood to be an error. Thus, if all of the recognized patterns fall within this subset, the code which has been read is determined, in step 118, to have been checked in a manner indicating its correctness, and the data is reported to another system, which may be local or remote, in step 120. Other forms of error detection may be alternately or additionally used, with, for example, a check digit being used to determine the validity of a numerical sequence. This step of reporting the data may be accompanied by the illumination of, for example a green LED among the indicators 102. On the other hand, if one or more of the patterns recognized in step 116 is not that of a legitimate character, it is determined, in step 118, that the code has not been checked in a manner indicating its correctness, so the system proceeds to step 122.

In accordance with a preferred version of the present invention, the magnetically encoded information of the document 12 is read up to a predetermined maximum number of times, with the force applied to the document 12 by the pressure plate 26 or 64 being incrementally increased between each attempt to read the information. For example, three attempts may be made to read a particular line of information before a determination is made that the line will not be read. Thus, in step 122, a determination is made of whether the last pass has been completed, i.e. of whether the line of information has already been read the predetermined number of times. If it has not, in the example of the first embodiment 8 of FIG. 1, the cam plate 42 is rotated through an incremental angle in the direction of arrow 48 in step 124, or, in the example the second embodiment 60 of FIG. 2, the stepper motor 72 drives the leadscrew 74 to be driven downward, in the direction of arrow 34. Either of these actions cause the force between the pressure plate 38, 64 and the document 12 to be increased. The system then returns to step 114 so that the ink is again magnetized as the encoded information is moved past the read head 18 in the forward direction of arrow 22, with the increased level of force, and so that another attempt is made to read the information in step 116, as the document is moved rearward, opposite the direction of arrow 22, in step 116. On the other hand, if the last pass has already been completed, as determined in step 122, the failure of the process is reported in step 126, for example, by illuminating a red LED among the indicators 102.

In this way, incrementally increasing levels of force are applied by the pressure plate 26, 64 when the magnetic codes are not properly read. This increased force is helpful in locally straightening wrinkled checks so that the magnetic codes can be properly read, and in correctly resolving the magnetic images of damaged checks. This increased force is only applied when it is needed, as determined by a failure to read the encoded information correctly. The alternative of consistently applying an increased level of force is not implemented to avoid unnecessary wear on the pressure plate 26 and on the magnetic read head 18, and to avoid unnecessary document handling problems, including document jams. Since some documents are so badly damaged that they cannot be correctly read, even through the application of the present invention, the number of tries is limited to a predetermined maximum number.

Whether the attempts described above result in the successful reading of the magnetically encoded information, with the data being reported in step 120, or in an unsuccessful reading operation, as reported in step 128, the document 12 is subsequently ejected from the apparatus 10 in step 130. With the exemplary apparatus 10 of FIG. 1, if the force between the pressure plate 26 and the document 10 has been increased from its initial level, the force is initialized by driving the cam plate 48 to its original position, opposite the direction of arrow 48, with the pressure regulating stepper motor 46. With the exemplary apparatus 60 of FIG. 2, leadscrew 74 is returned upward, opposite the direction of arrow 34, to an initial level causing a space to be formed between the pressure plate 64 and the magnetic read head 18 regardless of whether the force between the pressure plate 64 and document 12 has been increased. Then the document 12 is ejected, for example, by driving the document in the reverse direction, opposite the direction of arrow 22, with the feed rolls 12 being driven by the document drive stepper motor 14.

Figure 5:
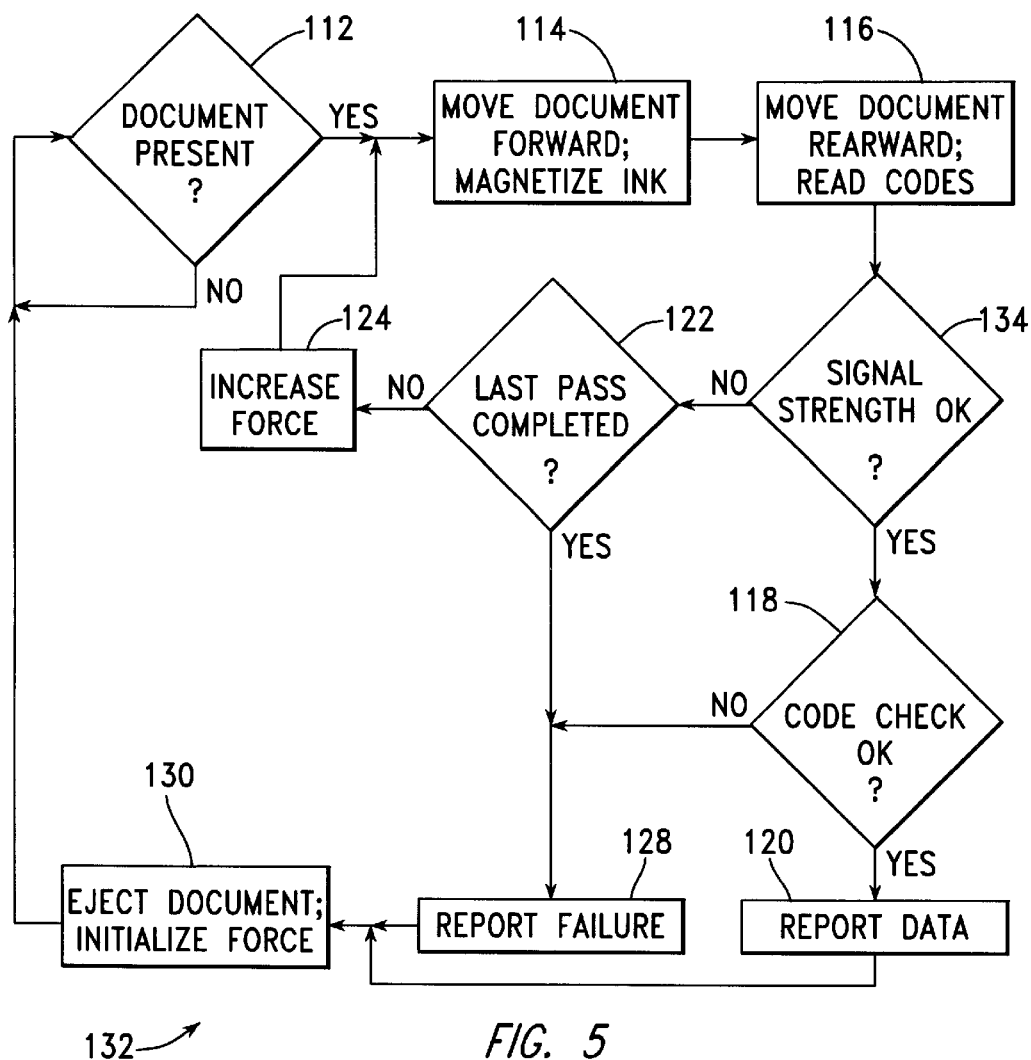
FIG. 5 is a flow chart of a second version of a process occurring within the embodiment of FIG. 1 or of FIG. 2.

FIG. 5 is a flow chart of an alternative process 132 occurring within either the first embodiment 8 of the present invention, as described above in reference to FIG. 1, or within the second embodiment 60, as described above in reference to FIG. 2. Most of the steps of the alternative process 132 are similar or identical to corresponding process steps of the process 110 described above in reference to FIG. 4, and are therefore afforded the same reference numbers.

As described above in reference to FIG. 3, the amplifier 94 preferably provides a SIGNAL STRENGTH output signal indicating the quality or strength of the data signal read through the magnetic read head 18. In the alternative process 132, this signal is used in step 134 to determine whether the signal strength or quality of magnetic codes read in step 116 is sufficient to indicate that such codes should have been read correctly. If the signal strength signal is in a satisfactory range, the system proceeds to step 118, where the codes which have been read are checked to determine if they represent valid characters. If they are all correct, the data is reported in step 120; if they are not all correct, a failure is reported in step 128. If the signal strength is not in the satisfactory range, as determined in step 134, a determination is made in step 122 of whether the last pass has been completed. This method is considered to be a form of error detection in which the signal strength or quality is considered to be particularly important in determining whether the data as read should be considered reliable. From this point, the system proceeds as described above in reference to FIG. 4.

In this previously described version of the alternative process 132, the code check of step 118 is performed only after a determination is made, in step 134 that the signal strength is in the satisfactory range. Alternately, the code check of step 118 may be performed after the last pass has been completed, as indicated in step 122, regardless of whether the signal strength is in the satisfactory range.

The present invention is readily utilized within apparatus having an additional capability of printing information on checks and other documents, as described in U.S. Pat. Nos. 5,634,729 and 5,865,547. In such apparatus, printing operations preferably occur after the code has been checked as being read correctly in step 118, with printing occurring before the document is ejected in step 130.

While the process of reading magnetic ink patterns has been described in terms of moving the patterns past the magnetic head in a first direction, with a coil within the magnetic read head being energized to produce a magnetic field magnetizing the patterns, it is understood that moving the patterns past a permanent magnet adjacent the document path can be used for such magnetization of the patterns, without using the magnetic read head for magnetization, and without departing from the spirit and scope of the present invention.

While the present invention has been described in particular embodiments configured for reading the patterns of MICR characters, particularly as such characters are printed on checks, it is recognized that the present is alternatively adapted for reading codes magnetically recorded on magnetic strips, for example on credit cards. In such an application, it is neither necessary nor desirable to magnetize the strip before it is read. Therefore, the magnetic head is not driven to magnetize the pattern as it is moved by the magnetic head, and a permanent magnet for this purpose is left out of the document path. Document drive rolls 12 may be used in the manner described above, or, in the case of a credit card, the stiffness of the card may be used to allow the user to move the document in the forward direction of arrow 22 and then back out, as often as required by visual and/or audible prompts.

While the invention has been described in its preferred forms or embodiments with some degree of particularity, it is understood that this description has been given only by way of example and that numerous changes in the details of construction, fabrication and use, including the combination and arrangement of parts and process steps, may be made without departing from the spirit and scope of the invention.

We claim:

1. Apparatus for reading magnetically encoded information on a document, wherein said apparatus comprises:
    a document path along which said document is moved;
    a magnetic read head adjacent a first side of said document path, wherein said magnetic read head is aligned with said document path so that said magnetically encoded information moves adjacent said magnetic read head as said document is moved along said document path with said magnetic information adjacent said first side of said document path;
    a pressure plate adjacent a second side of said document path, opposite said first side of said document path, wherein said pressure plate is aligned with said magnetic read head so that said document moves along said document path between said pressure plate and said magnetic read head;
    pressure application means for applying a level of pressure established through said document between said pressure plate and said magnetic read head, wherein said level of pressure is varied in increments; and
    a controller including error detection means, for determining when all codes within said magnetically encoded information have been correctly read, and pressure control means, for operating said pressure application means in response to said error detection means to increase said level of pressure following a failure to read all said codes correctly and before an additional attempt to read all said codes correctly.

2. The apparatus of claim 1, wherein
    said apparatus additionally comprises a drive roll rotated by a document drive motor for moving said document in a forward direction along said document path, and in a rearward direction, opposite said forward direction, along said document path,
    said magnetically encoded information is read as said document is moved in said rearward direction,
    said controller operates said document drive motor to move said document in said forward and rearward directions for reading said magnetically encoded information in a first attempt, and
    in response to an indication from said error detection means that said magnetically encoded information has not been read correctly in said first attempt, said controller operates said document drive motor and said pressure application means for reading said magnetically encoded information in an additional attempt, following an increase in said level of pressure.

3. The apparatus of claim 2, wherein, in response to an indication from said error detection means that said magnetically encoded information has not been read correctly in an additional attempt, said controller operates said document drive motor and said pressure application means for reading said magnetically encoded information in another additional attempt, following an additional increase in said level of pressure, until a predetermined maximum number of attempts to read said magnetically encoded information has occurred.

4. The apparatus of claim 3, wherein
    said apparatus additionally comprises indicators giving an indication of an operational status of said apparatus,
    said controller operates said indicators to provide a first indication in response to an indication from said error detection means that said magnetically encoded information has been read correctly and to provide a second indication in response to an indication that said predetermined maximum number of attempts has occurred without an indication from said error detection means that said magnetically encoded information has been read correctly.

5. The apparatus of claim 3, wherein said controller operates said document drive motor to cause said document to be released from said apparatus in response to an indication from said error detection means that said magnetically encoded information has been read correctly, and in response to an indication that said predetermined maximum number of attempts has occurred without an indication from said error detection means that said magnetically encoded information has been read correctly.

6. The apparatus of claim 3, wherein said controller causes data derived from said magnetically encoded information to be transmitted in response to an indication from said error detection means that said magnetically encoded information has been read correctly.

7. The apparatus of claim 2, wherein a drive current is applied to said magnetic read head for magnetizing magnetic ink forming said magnetically encoded information as said document is moved adjacent said magnetic read head before reading said magnetically encoded information.

8. The apparatus of claim 1, additionally comprising a permanent magnet for magnetizing magnetic ink forming said magnetically encoded information as said document is moved adjacent said permanent magnet before reading said magnetically encoded information.

9. The apparatus of claim 1, wherein
    said pressure plate is movably mounted adjacent said second side of said document path, and
    said pressure application means includes an input arm movably mounted adjacent said pressure plate, a spring extending between said input arm and said pressure plate, and a force-controlling motor moving said input arm.

10. The apparatus of claim 9, wherein said pressure application means additionally includes a cam plate rotationally driven by said force-controlling motor, and said cam plate includes a peripheral surface moving against said input arm to move said input arm in a pressure increasing direction causing said spring extending between said input arm and said pressure plate to increase a level of force applied to said pressure plate, and in a direction opposite said pressure increasing direction.

11. The apparatus of claim 9, wherein said pressure application means additionally includes a leadscrew rotationally driven by said force-controlling motor, and said leadscrew causes said input arm to move in a pressure increasing direction causing said spring extending between said input arm and said pressure plate to increase a level of force applied to said pressure plate, and in a direction opposite said pressure increasing direction.

12. The apparatus of claim 9, wherein said pressure application means additionally includes a stop limiting movement between said input arm and said pressure plate, and said force-controlling motor moves said input arm between an initial position, in which said stop limits movement between said input arm and said pressure plate, causing a gap to exist between said pressure plate and said document, and a plurality of load positions causing varying levels of force to be applied to said pressure plate.

13. The apparatus of claim 1, wherein said error detection means determines whether code patterns read represent legitimate codes.

14. The apparatus of claim 1, wherein said controller reads a signal strength signal, associated with said magnetic read head, indicating a level of strength or quality in output signals from said magnetic read head, and said error detection means compares said signal strength signal with an acceptable threshold level.

15. A process for reading magnetically encoded information on a document, wherein said process comprises steps of:

(a) generating information by performing a first attempt to read said magnetically encoded information with a magnetic read head as said document is moved along a document path in a document reading direction with said magnetically encoded information being moved past said magnetic read head;

(b) determining if errors are present within said information generated in step a);

(c) if errors are not present within said information generated in step (a), terminating said process and restoring mechanical pressure between said magnetic read head and said document to an initial level, if said mechanical pressure has been increased;

(d) if errors are present within said information generated in step (a), increasing mechanical pressure between said magnetic read head and said document, and repeating steps (a) through (d) until step (a) has been repeated a predetermined maximum number of times; and (e) after step (a) has been repeated said predetermined maximum number of times, terminating said process and restoring mechanical pressure between said magnetic read head and said document to said initial level.

16. The process of claim 15, wherein step (b) includes determining whether code patterns read represent legitimate codes.

17. The process of claim 15, wherein step (b) includes comparing a signal, indicating a level of signal strength and quality within an output of said magnetic read head, with a predetermined level.

18. The process of claim 15, wherein step (c) includes transmitting said information generated in step (c).

19. The process of claim 15, wherein step (a) is preceded by:

detecting the insertion of said document within said document path, and rotating a document drive roll to move said magnetically encoded information opposite said reading direction past said magnetic read head.

20. The process of claim 19, wherein steps (c) and (e) are followed by rotating said document drive roll to eject said document from said document drive roll.

* * * * *